UNITED STATES PATENT OFFICE.

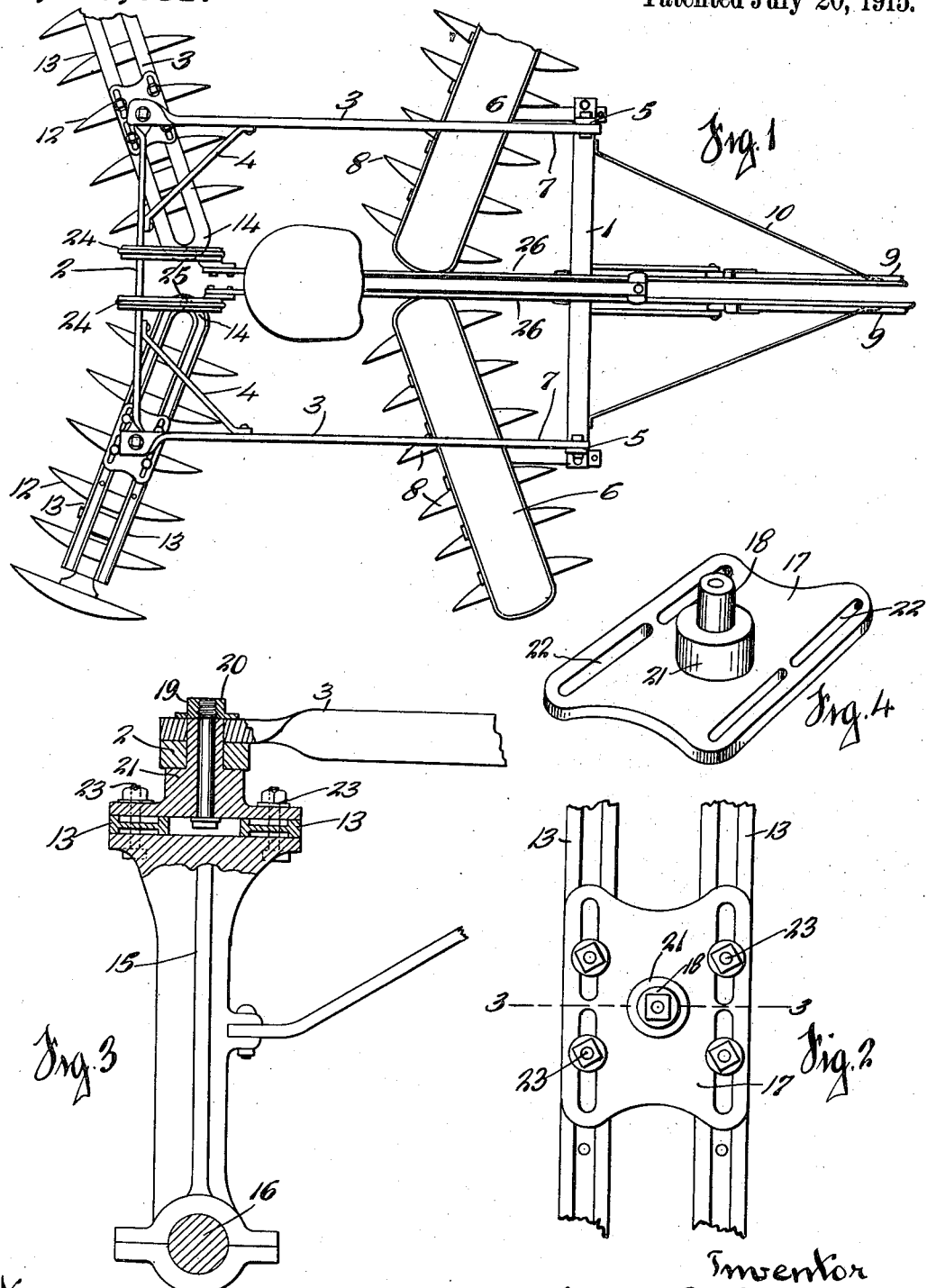

FRANK N. TRISSEL, OF DAYTON, OHIO, ASSIGNOR TO THE OHIO RAKE COMPANY, OF DAYTON, OHIO, A CORPORATION OF OHIO.

DISK HARROW.

1,147,281. Specification of Letters Patent. Patented July 20, 1915.

Application filed August 8, 1914. Serial No. 855,720.

*To all whom it may concern:*

Be it known that I, FRANK N. TRISSEL, a citizen of the United States, and a resident of Dayton, in the county of Montgomery and State of Ohio, have invented certain new and useful Improvements in Disk Harrows, of which the following is a full, clear, and exact description, reference being had to the accompanying drawings, forming part of this specification.

My invention relates to double disk harrows in which two sets of gangs are employed one behind the other, each gang composed of a set of round or cut disks, the implement comprising in effect a pair of two gang harrows, one traveling in front of the other. The front pair of gangs usually has the disks set to throw the soil outward from each side of the center and the rear pair has the disks set in the opposite way and each located to follow between the furrows made by the front disks to throw the soil inwardly and at the same time pulverize it.

My improvements have special relation to that class of double gang harrows in which a main frame is employed for all of the gangs. Where such a main frame is employed, the two rear gangs are mounted in fixed lateral position with reference to the front gangs. It sometimes happens that the rear gang fails to trail properly. As it is an essential thing in a harrow of this kind that the disks of the rear gangs should follow between the furrows made by the front disks, it becomes of importance that means be provided to permit of the lateral adjustment of the rear gangs to bring them into proper alinement.

It is the principal object of my invention to provide means for attaining this lateral adjustment in a simple and effective manner, as will be hereinafter particularly pointed out and claimed.

In the drawings, Figure 1 is a plan view of my improved disk harrow construction. Fig. 2 is a plan view of a portion of one of the rear gang frames and the casting for coupling the gang to the main frame. Fig. 3 is a vertical section, taken on the lines 3, 3, of Fig. 2. Fig. 4 is a perspective view of the plate casting.

The main frame of the implement comprises a front bar 1, a rear cross bar 2 and side bars 3, 3. The rear and side bars are firmly braced together by the cross braces 4, 4, to give great strength, and the side bars are mounted by horizontal pivots 5, 5, to the front cross bar 1, so as to allow the rear set of gangs to shift vertically with reference to the front gang, while at the same time there is sufficient lateral flexibility in the side bars 3, 3, to allow turns to be made without undue strain on the frame. The two front gangs 6, 6, are suitably mounted in hangers 7, 7, secured to the front cross bar at the ends, and these gangs are composed of a series of disks 8, 8, and the gangs are so mounted in the hangers that they can be turned at an angle to the line of draft. These disks for the front gangs are set to throw the soil outwardly, and these gangs are adjusted by means of end levers 9, 9, pivotally mounted on the tongue 10 of the implement, the lower ends of the hand levers being connected by pulling bars with the gang frames in the usual way. Each of the rear gangs with the disks 12, 12, preferably set to throw the dirt inwardly, is mounted in a gang frame made up of two parallel bars 13, 13, preferably integrally connected at their inner ends by the curved transverse portions 14, 14. Each disk gang is supported from its gang frame by hangers 15, one of which is shown in Fig. 3, and 16 represents the axle of the gang. As many of these hangers for supporting the gangs from the gang frames are employed as may be necessary for the length of the gang.

The gang frames 13 are pivotally secured to the main frame to swing in a horizontal plane about midway of their length by the plate casting 17, one for each gang. This plate casting is provided with a vertically extending pivot stud 18 upon which the side bar 3 and the rear cross bar 2 are pivotally secured, preferably by a bolt 19 passed up through the stud and secured by a flanged nut 20. A boss 21 is formed at the base of the stud 18 to support the main frame parts. The plate casting 17 is provided with slots 22, 22, by means of which the casting is secured to the gang frame and hanger by bolts 23. Preferably the same bolts that secure the hanger to the gang frame are used for securing the pivot casting to the gang frame. With these slotted plates 17, it will be evident that by loosening the bolts 23, the gang frames and gangs can be adjusted laterally so as to bring the travel of the rear set of disks in proper alinement to the front set.

The rear gangs are arranged to be adjusted angularly to the line of draft by the coupling blocks 24, each of which consists of a loop to embrace the rear cross bar 2 and to allow free movement back and forth of the loop on the cross bar. The base of the loop is pivotally secured at 25 to the transverse portion 14 of the gang frame, and each of the loops is connected by a coupling bar 26 with the hand levers 9, 9, above the pivotal point of the levers, so that with the front gangs attached to the same levers below the pivots of these levers on the tongue when the levers are actuated, the inner ends of the front gangs will be shifted rearwardly and the inner ends of the rear gangs will be drawn forward, or vice versa to uniformly adjust both sets of gangs.

Having thus described my invention, what I claim as new and desire to secure by Letters Patent, is:—

1. In a disk harrow, the combination with the main frame and two pairs of disk gangs pivotally mounted therein, one pair in the rear of the other, of means for laterally adjusting one pair of the gangs with relation to the other, comprising a plate casting for each gang of one pair, with pivot stud thereon to pivotally connect the plate to the main frame and slots in the plate with bolts for adjustably securing the plate to the gang frame.

2. In a disk harrow, the combination with the main frame comprising a front bar, side bars and a rear cross bar, of a pair of disk gangs pivotally mounted to the front bar, and a pair of disk gangs pivotally mounted to the main frame at the rear corners, a plate casting for each rear gang with vertical stud thereon to receive the ends of the side bars and rear cross bar to couple the frame together, said plate provided with longitudinal slots and bolts for securing the plate to its rear disk gang, whereby the rear gangs may be adjusted laterally with reference to the front gang.

FRANK N. TRISSEL.

Witnesses:
 LOUIS PHILIPPS,
 O. F. DAVISSON.